US010945083B2

(12) United States Patent
Porsbo et al.

(10) Patent No.: US 10,945,083 B2
(45) Date of Patent: Mar. 9, 2021

(54) HEARING AID CONFIGURED TO BE OPERATING IN A COMMUNICATION SYSTEM

(71) Applicant: Oticon A/S, Smørum (DK)

(72) Inventors: Michael Porsbo, Smørum (DK); Jens Rosenstand, Smørum (DK); Per Sandholm, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 16/179,192

(22) Filed: Nov. 2, 2018

(65) Prior Publication Data
US 2019/0149928 A1 May 16, 2019

Related U.S. Application Data

(63) Continuation of application No. 15/445,589, filed on Feb. 28, 2017, now Pat. No. 10,149,075.

(30) Foreign Application Priority Data

Mar. 1, 2016 (EP) .................................... 16158042

(51) Int. Cl.
*H04R 25/00* (2006.01)
*H04M 1/60* (2006.01)
(Continued)

(52) U.S. Cl.
CPC ........ *H04R 25/558* (2013.01); *H04M 1/6066* (2013.01); *H04R 25/30* (2013.01);
(Continued)

(58) Field of Classification Search
CPC ...... H04R 25/558; H04R 25/55; H04R 25/45; H04R 27/02; H04R 2225/33;
(Continued)

(56) References Cited

U.S. PATENT DOCUMENTS 7,925,606 B1 4/2011 Katzer et al.
2006/0045304 A1 3/2006 Lee et al.
(Continued)

FOREIGN PATENT DOCUMENTS

EP 1720 357 A1 11/2006
WO WO-2011/037982 A1 3/2011

*Primary Examiner* — Sunita Joshi
(74) *Attorney, Agent, or Firm* — Birch, Stewart, Kolasch & Birch, LLP.

(57) ABSTRACT

The invention relates to a communication system comprising a hearing aid, a communication unit, a relay server, a rule processing server, and at least one external device, wherein the rule processing server comprises a data communication interface to communicate with said relay server and with a plurality of external devices over a plurality of data communication channels, a rule processor, and a rule base comprising a set of rules, each rule defining an action to be triggered in response to a trigger event. Said rule processor is configured to generate an action request signal in response to an event signal representing a trigger event. Said action request signal is configured to cause an action of at least one of the hearing aid, the communication unit, the relay server or the external device, and wherein said action request signal carries information that designates at least one of said devices and at least one action to be performed of said at least one device. Said communication system further comprises an event detector that is configured to detect a trigger event and to generate the event signal in response to a detection of the trigger event.

14 Claims, 5 Drawing Sheets

(51) Int. Cl.
　　　*H04M 1/725*　　(2006.01)
　　　*H04R 27/02*　　(2006.01)
(52) U.S. Cl.
　　　CPC ........... *H04R 25/55* (2013.01); *H04R 25/554*
　　　　　　(2013.01); *H04M 1/7253* (2013.01); *H04M*
　　　　　　*1/72591* (2013.01); *H04R 25/305* (2013.01);
　　　　*H04R 25/45* (2013.01); *H04R 27/02* (2013.01);
　　　　　　*H04R 2225/33* (2013.01); *H04R 2225/55*
　　　　　　　　(2013.01); *H04R 2460/07* (2013.01)
(58) Field of Classification Search
　　　CPC ........... H04R 2225/55; H04R 2460/07; H04M
　　　　　　　　1/6066; H04M 1/7253; H04M 1/72591
　　　See application file for complete search history.

(56) References Cited

U.S. PATENT DOCUMENTS

| | | | |
|---|---|---|---|
| 2011/0280422 A1 | 11/2011 | Neumeyer et al. | |
| 2012/0213393 A1* | 8/2012 | Foo ...................... | H04R 25/554 |
| | | | 381/315 |
| 2015/0230036 A1* | 8/2015 | Pedersen ............. | H04R 25/305 |
| | | | 381/330 |
| 2015/0256385 A1* | 9/2015 | Chandhok ............... | H04L 41/18 |
| | | | 715/734 |

* cited by examiner

HEARING AID CONFIGURED TO BE OPERATING IN A COMMUNICATION SYSTEM

CROSS-REFERENCE TO RELATED APPLICATIONS

This application is a Continuation of copending application Ser. No. 15/445,589, filed on Feb. 28, 2017, which claims priority under 35 U.S.C. § 119(a) to Applications No. 16158042.8, filed in the European Patent Office on Mar. 1, 2016, all of which are hereby expressly incorporated by reference into the present application.

FIELD

The invention relates to a communication system. The invention further relates to a hearing aid configured to be used in the communication system, and to a method for operating a communication system.

BACKGROUND

Wireless communication between a hearing aid and external audio devices are widely used by people who suffer from hearing limitations or hearing loss in order to normalize their life. The external audio devices are typically a TV set or a stereo set or a telephone device which is connected to the hearing aid via a Bluetooth or a ZigBee communication channel.

Document EP 1 720 375 A1 describes a system for enabling a hearing aid wireless access to a communication network. The system comprises a first transceiver unit in said hearing device communicating according to a first communication protocol. The system further comprises a server device comprising an input/output unit, which is connected to the communication network and communicates according to a second communication protocol, a second transceiver unit, which is connected wirelessly to the first transceiver unit and communicates according to the first communication protocol, and comprising a translator unit, which interconnects the second transceiver unit and the input/output unit and translates between the first and second communication protocol.

It is an object of the invention to provide an improved communication system.

SUMMARY

According to a first aspect, the invention relates to a communication system that comprises a hearing aid, a communication unit, a relay server, a rule processing server, and at least one external device. The hearing aid comprises a microphone, a sound signal processor, an output transducer and a signal interface, wherein the microphone, the output transducer and the signal interface are operatively connected to the sound signal processor.

The microphone is further configured to convert an acoustic sound signal into an electric sound signal. The sound signal processor is configured to receive and process the electric sound signal and to provide a processed electric sound signal to the output transducer. The output transducer is configured to convert the processed electric sound signal into a mechanical signal, for instance into a particular vibration of a membrane providing an acoustic tone.

The sound signal processor is further configured to process signals received via the signal interface. Signal transmission and/or receiving means are provided to transmit and/or receive signals to and/or from the hearing aid via the signal interface. The signal transmission and/or receiving means form a part of the communication unit. The communication unit further comprises a communication unit interface that is configured to receive and/or transmit data from and/or to the relay server.

The relay server comprises a network interface being at least indirectly connected to the rule processing server. The relay server is at least indirectly connected to a communication gateway for communicating with the communication unit interface of the communication unit.

The rule processing server comprises a data communication interface to communicate with the relay server and with a plurality of external devices over a plurality of data communication channels. The rule processing server further comprises a rule processor and a rule base comprising a set of rules, each rule defining an action to be triggered in response to a trigger event. The rule processor is configured to generate an action request signal in response to an event signal representing a trigger event being associated to a rule of the set of rules. The action request signal is configured to cause an action of at least one device of a device group comprising the hearing aid, the communication unit, the relay server and/or the external device.

Furthermore, according to the first aspect of the invention, the action request signal is carrying information that designates at least one of the devices and at least one action to be performed by the at least one device.

The rule processing server is further configured to dispatch the action request signal to a respective device of the device group via at least one of the plurality of data communication channels. The communication system further comprises an event detector that is configured to detect a trigger event and to generate the event signal in response to a detection of the trigger event, wherein the event detector is either part of the rule processing server, the hearing aid, the communication unit, the relay server and/or the at least one external device.

The communication system according to the first aspect of the invention can advantageously provide the action request signal for triggering an action of a device of the device group. This can help to normalize the life of hearing aid user by triggering audio sounds provided via the mechanical signals of the output transducer or by triggering actions of external devices with respect to a trigger event, which might be triggered by the hearing aid user.

Furthermore, the communication between the communication unit and the relay server is not restricted to a certain spatial region around the relay server. Therefore the devices of the device group can be provided at different places as long as they can communicate with each other via their respective interface, which for instance might involve an internet-based connection for the communication between the communication unit and the relay server, or for the communication between relay server and rule processing server.

In principle, every ordinary hearing aid that comprises a signal interlace that allows a transmission and/or reception to transmit and/or receive signals between hearing aid and communication unit is suitable for being used in the communication system. Thus, the communication system of the present invention is easily applicable to common hearing aids.

Furthermore, the rule processing server with a plurality of data communication channels allows data communication with different external devices. Therefore, a large variety of actions caused by the action request signal are possible, enabling a respective variety of possible applications for the communication system regarding the daily life of the hearing aid user.

Communication denotes in the following an exchange of signals that represent data between two devices that are at least indirectly connected. Such an exchange of signals is usually provided according to a communication protocol, such as TCP/IP, UDP, IPX or SPX.

A server forms a physical node within the communication system, which can receive and transmit signals to devices that are at least indirectly connected to the server, i.e. that are directly connected to the server or via a number of further devices.

The action to be performed by at least one device of the device group is a change of a state of the at least one device compared to the state that would be present without the action.

In the following, embodiments of the system according to the first aspect will be described.

The external device is preferably an external system, comprising an external server to communicate over at least one data communication channel with the rule processing server, and further comprising an execution unit, configured to execute actions. The execution unit also has an external interface configured to provide data communication between the external server and the execution unit.

The relay server of a preferred embodiment of the communication system is at least indirectly connected to a plurality of communication gateways for communicating with a corresponding plurality of communication units, wherein each communication unit comprises a signal transmission and/or receiving means to transmit and/or receive signals to and/or from a respective hearing aid. Each communication unit may be dedicated to the relay server via an application software installed on the communication unit, where the application software allows communication between the communication unit and the relay server. Additional, the application software allows communication between the communication unit and a hearing aid. The relay server may serve as a central server for controlling a communication of a plurality of hearing aids with the rule processing server. The relay server may serve as a central server for controlling a communication of a plurality of communication units, and thereby multiple hearing aids, with one or more rule processing servers. Thereby the communication system can be easily updated or controlled, since the number of relay servers is small, compared to a system, wherein every hearing aid has its own relay server. Furthermore, the advantage of having the relay server is that the hearing aid communicating with the relay server is able to communicate with multiple external devices, which may be configured to multiple different rule processing servers, respectively. Thereby, with this solution the hearing aid does not need to be configured to communicate with different rule processing servers, which in addition means that a communication interface (i.e. which is configured to communicate wirelessly with a communication unit) of the hearing aid becomes less complexed. For example, a first external device is configured to a first rule processing server, e.g. an IFTTT server, and a second external device is configured to a second rule processing server, e.g. an Amazon server, and in this example the hearing aid is configured to receive an action request signal from both external devices via the relay server. Furthermore, more users can profit from the advantages of the communication system, for instance by performing the triggering of an action of at least one of the external devices connected to the rule processing server. Allowing a plurality of hearing aids and thus a plurality of users, might help to improve the rule base of the rule processor server by providing feedback in form of a hearing aid input or in form of an automatic malfunction report. Using a single relay server and a single rule processing server or multiple rule processing servers for a plurality of hearing aids further helps to reduce the costs for providing the communication system to a large number of hearing aid users.

In a preferred variant of the communication system according to the previous embodiment, the relay server is further configured to dispatch the action request signal to at least one of said hearing aids connected to said relay server according to the respective rule of said set of rules. This allows a triggering of the action at a specific hearing aid or a specific group of hearing aids depending on the respective rule. The rule thus defines the action request signal indicative of a hearing aid ID or of a group of hearing aid IDs corresponding to the hearing aids to which the action request signal should be dispatched to.

In an embodiment of the communication system, the definition of rules that refer to a specific hearing aid is provided by a further communication channel of the rule processing server, e.g. a communication channel between communication device and rule processing server, which is arranged and configured to allow a user of the hearing aid to generate a rule by defining an action to be triggered in response to a trigger event. The further communication channel thus forms a rule generation channel. This user generated rule either applies only to the hearing aid of the user or to a predefined group of hearing aids, which might also comprise the hearing aid of the user. Thereby the user can generate rules according to his or her own hearing limitations. The predefined group of hearing aids might be formed by the hearing aids in a surrounding of the user, or the hearings aids of an audience of the user. The further communication channel can also be provided in variants of this embodiment between the rule processing server and a mobile phone, a notebook, a computer or any other electronic communication device.

In a further preferred embodiment, the action request signal comprises a representation of a sound signal. Preferably, the hearing aid, the communication unit, or the relay server are configured to perform the action by converting the action request signal into a sound signal that causes the hearing aid to put out a respective audible acoustic sound signal. In a variant of this embodiment, the hearing aid, the communication unit, or the relay server further comprise a signal memory and are further configured to perform the action according to the action request signal by storing the sound signal in the signal memory. A sound signal according to this embodiment can be a spoken text, a single spoken word or a tone, e.g. a signal tone of a clock, an alarm system or a smoke detector. The communication system according to this embodiment therefore allows the user of a hearing aid, upon detection of a respective trigger event by the detection unit, to perceive an acoustic sound signal besides the ambient sound signals received by the microphone of the hearing aid. In a variant of this embodiment, the communication unit or the hearing aid is further adapted to process the sound signal according to the respective type of hearing deficit of the hearing aid user, in particular according to a special type of hearing deficit that might not require a common hearing aid, as for instance a so-called sensorineural hearing loss of retro-cochlear origin.

In an additional or alternative embodiment of the communication system the communication unit or the relay server or the hearing aid further comprise a sound signal memory, which is configured to store data representing at least one predefined sound signal that can be processed by the sound processor of the hearing aid and cause the hearing aid to output an audible acoustic sound signal. The action request signal is configured to cause the communication unit or the relay server to transmit said predefined sound signal to the hearing aid. Additionally or alternatively, the action request signal is configured to cause the hearing aid to transmit said predefined sound signal to said sound signal processor of the hearing aid. Storing data in the sound signal memory leads to small signal sizes of the respective action request signal, since the action request signal just needs to comprise information allowing an allocation of the action request signal to the respective predefined sound signal, but does not comprise the sound signal itself. This circumvents usual high resource demands that usually occur in Text-to-Speech applications and thereby improves usability of such applications in many day to day situations, e.g. providing a spoken program name of a used audio program of the hearing aid, a TV set or a stereo set. By updating the at least one predefined sound signal within the sound signal memory, the communication system can be updated externally without any input of the hearing aid user. In variants of this embodiment, the predefined sound signal is indicative of a power level of the hearing aid or of the external device, or of a malfunction or of a further processing information concerning the hearing aid or the external device.

In a further additional or alternative embodiment of the communication system, the action request signal carries information that designates an activation or a deactivation of the external device or of the hearing aid, or a predefined change of a sound level provided by the hearing aid. In addition or alternatively to the provision of an acoustic sound to the hearing aid user, the communication system of this embodiment is configured to trigger a process of the hearing aid or of the external device. This is advantageous for situations, in which the environment leads to characteristic acoustic requirements. For instance, an event signal triggered by a connection of the hearing aid with the communication unit located in the apartment of the hearing aid user might cause an increased ouput-sound level of the hearing aid, since a private apartment is usually calmer than a crowded public place. In a further variant, an activation of the hearing aid during the morning hours forms a trigger event that triggers an activation of respective room lights.

According to a further embodiment, the event detector is a part of the external device and is configured to detect a beginning or end of a predefined process performed by the external device, or a storing of a predefined content or a predefined content characteristic on a memory that is functionally connected to the external device, or an activation or deactivation of the external device, or a combination thereof as a trigger event. The detection of a beginning of a predefined process performed by the external device is performed in a variant of this embodiment by a detection unit within a reading device, preferably a wireless reading device such as a translator pen, that forms the external device and sends an event signal that represents a spoken version of a text scanned by the reading device. Thereby, a hearing aid user who is also visually impaired can hear a respective text via the hearing aid in a properly amplified manner. The relay server or the communication unit might also be configured to translate the spoken version of the text, which is represented by a respective audio signal, into a language chosen by the hearing aid user by generating a translated audio signal. In a further variant, the external device is formed by a mobile phone or a group of mobile phones which are activated, by a respective user input, in order to detect a speech which is held in front of an audience. By detecting a beginning of the speech, the mobile phone or the group of mobile phones is configured to stream sound data indicative of the speech and to provide the sound data to at least one hearing aid user which is connected to the mobile phone or to the group of mobile phones via the communication system. The streamed sound data can enable the hearing aid user to follow the speech in spite of bad acoustics in the surrounding. An example for the storing of a predefined content or a predefined content characteristic as a trigger event is the reception of a message by a mobile phone, a notebook or any other electronic device forming the external device or the communication unit of the communication system. The reception triggers an event signal, which causes, due to a respective rule of the rule processing server, the hearing aid to put out a tone signaling the reception of a message or a spoken text representing the content of the received message. In this example, the mobile phone can serve as communication unit that triggers an event signal. In other variants, an external device detects a storage of an article on a web server whose headline comprises a predetermined keyword and triggers an acoustic audio signal configured to informing the hearing aid user that such an article is published.

The communication unit is in a preferred embodiment a mobile phone that is wirelessly connected to the hearing aid and to the relay server. Thereby, the communication unit can rest near the hearing aid user and enables an operation of the communication system according to the first aspect of the invention.

The signal interface of the hearing aid is preferably a ZigBee or a Bluetooth interface, in particular a Bluetooth low energy (BLE) interface, that allows data communication with the communication unit. In other embodiments, the communication unit is attached to the hearing aid and thus provides a wired connection to the hearing aid.

The communication unit interface, which connects the communication unit at least indirectly with the relay server, is preferably arranged and configured to be a wireless interface, as for instance via wireless data communication based on the public mobile network.

The relay server and the rule processing server as well as the communication unit and the relay server are preferably connected via a global network, in particular via the internet. In this preferred embodiment, these devices are further configured to communicate according to a communication protocol, such as TCP/IP, UDP, IPX or SPX. The relay server and/or the rule processing server might further comprise a respective translation unit configured to translate between a first communication protocol corresponding to the a received signal and a second communication protocol corresponding to a transmitted signal.

The external device can be formed by a further communication unit and/or by a further hearing device of the communication system. The data communication interface for the communication between rule processing server and relay server might also be formed by the plurality of data communication channels connecting the rule processing server with the at least one external device.

The rule processing server can be an IFTTT server or any other server capable of generating the action request signal according to the first aspect of the invention.

According to a second aspect, the invention relates to a hearing aid that is configured for being used in a communication system according an embodiment of the first aspect of the invention. The hearing aid comprises a microphone, a sound signal processor, an output transducer and a signal interface, wherein said microphone, said output transducer and said signal interface are operatively connected to the sound signal processor. The microphone is further configured to convert an acoustic sound signal into an electric sound signal, and the sound signal processor is configured to process the electric sound signal and to provide a processed electric sound signal to the output transducer. The output transducer is further configured to convert the processed electric sound signal into a mechanical signal, and the sound signal processor is further configured to process signals received via the signal interface. The hearing aid according to the second aspect further comprises an event detector that is configured to detect a predefined trigger event and to generate an event signal in response to a detection of such a predefined trigger event, wherein the event detector is further configured to provide the event signal such that the event signal is transmitted via the signal interface of the hearing aid.

The hearing aid according to the second aspect can trigger an action of a further device by means of the event detector. If used in the communication system, the hearing aid allows the user to actively trigger an action, upon a detection of a trigger event.

In an embodiment of the hearing aid according to the second aspect of the invention, the event detector forming a part of the hearing aid is configured to detect a predefined change from a first spatial position of the hearing aid into a second spatial position of the hearing aid, or a change of a power level of the hearing aid under or above a predefined power level, or a change of a feedback level determined by the hearing aid under or above a predefined feedback level, or a malfunction of a component of the hearing aid, or a current operation of a manual user input interface of the hearing aid, or a reception of signals from the communication unit, or the end of a measuring period of a biosensor arranged within the hearing aid and functionally connected with the sound signal processor, or a combination thereof as a trigger event. In a variant, the predefined change from a first spatial position of the hearing aid into a second spatial position of the hearing aid might be detected by an accelerometer connected with the event detector that detects an awakening of the hearing aid user in the morning and thus triggers an activation of bedroom lights. The accelerometer further allows a detection of a specific head motion. Turning the head away from a TV set might disconnects a former wireless connection between hearing aid and TV set or automatically deactivates the TV set. In a further variant, a change of the power level of the hearing aid under a predefined level triggers a sound signal that causes the hearing aid to put out an acoustic sound signal indicating that a battery of the hearing aid is at a critical level, and preferably also indicating an estimated time left until the battery has not enough power to operate the hearing aid. In a related variant, the change of the power level of the hearing aid under a predefined level triggers a visual output indicating information concerning the power level of the battery, wherein the visual output is provided by a device of the user, e.g. a smartphone that forms the communication unit of the communication system.

A change of the feedback level above a predefined feedback level usually leads to a degradation of a sound quality level provided by the hearing aid. Therefore, a triggering of a respective spoken message or of a respective visual information that indicates the sound quality level change helps the hearing aid user, or further users of devices that form a part of the communication system, to know that the respective hearing aid user is hardly able to hear, so that they can act accordingly.

According to a further embodiment, the hearing aid comprises a user input interface. The user input interface might be a button or a wheel for controlling the output of the acoustic audio signal that is triggered by a trigger event.

In a preferred embodiment, a biosensor is arranged within the hearing aid and functionally connected with the sound signal processor of the hearing aid. Biosensors are for instance an accelerometer, an electroencephalograph (EEG), or a microphone. When used in the communication system according to the first aspect of the invention, the hearing aid of this embodiment can enable the hearing aid user, in particular elderly or handicapped people, to control external devices and interact with them, and thereby also to interact with people without the use of voice or gesture.

In an embodiment of the communication system according to the first aspect of the invention, the hearing aid is an embodiment of the hearing aid according to the second aspect of the invention. In a variant of this embodiment, the communication unit or the relay server is further configured to receive signals transmitted by the hearing aid and to determine those signals of the hearing aid, which are predefined to be event signals, and transmit them at least indirectly to the rule processing server.

According to a third aspect, the invention relates to a method for operating a communication system that comprises a hearing aid, a communication unit, a relay server, a rule processing server, and at least one external device, wherein the hearing aid comprises a microphone, a sound signal processor, an output transducer and a signal interface. The method comprises the steps of:

detecting a trigger event, generating an event signal upon detection of said trigger event, said event signal being indicative of a detected trigger event, generating an action request signal in response to an event signal based on a set of rules that define which action request signal is to be generated in response to a particular trigger event signal, dispatching the action request signal to an external device, the relay server, the communication unit or the hearing aid, and performing an action as specified by the action request signal by the external device, the relay server, the communication unit or the hearing aid, respectively.

In a preferred embodiment of the method, the action request signal is dispatched to the hearing aid and the hearing aid puts out an audio signal upon reception of the action request signal.

In a further embodiment, the trigger event is detected and an event signal is generated by the hearing aid and the event signal is further dispatched to the rule processing server. In a variant, the action request signal that corresponds to the event signal is provided to the at least one external device and triggers an action of this external device.

In a further embodiment of the method according to the third aspect of the invention, the action request signal is dispatched to the relay server or the communication unit and the relay server or the communication unit, respectively, transmits a predefined sound signal as specified by the action request signal to the hearing aid upon reception of the action request signal.

A communication system comprising a hearing aid, a communication unit, a relay server, a rule processing server, and at least one external device. The said hearing aid may comprise a microphone, a sound signal processor, an output transducer and a signal interface, said microphone, said output transducer and said signal interface being operatively connected to said sound signal processor, said microphone being configured to convert an acoustic sound signal into an electric sound signal, said sound signal processor being configured to process said electric sound signal and to provide a processed electric sound signal to said output transducer, said output transducer being configured to convert said processed electric sound into a mechanical signal, and said sound signal processor being further configured to process signals received via said signal interface. Said communication unit may comprise a signal transmission and/or receiving means to transmit and/or receive signals to and/or from said hearing aid via said signal interface, a communication unit interface that is configured to receive and/or transmit data from and/or to said relay server; and an application software that is configured to establish communication to said relay server via the communication unit interface and to said hearing aid via the signal transmission and/or receiving means. The said relay server may comprise a network interface being at least indirectly connected to said rule processing server and one or more other rule processing servers, and is at least indirectly connected to a communication gateway for communicating wirelessly with said communication unit interface of said communication unit dedicated to said relay server. Said rule processing server comprises a data communication interface to communicate with said relay server and with a plurality of external devices over a plurality of data communication channels, a rule processor, a rule base comprising a set of rules, each rule defining an action to be triggered in response to a trigger event, said rule processor being configured to generate an action request signal in response to an event signal representing a trigger event being associated to a rule of said set of rules, said action request signal being configured to cause an action of at least one device of a device group comprising the hearing aid, the communication unit, the relay server and/or the external device, said action request signal carrying information that designates at least one of said devices and at least one action to be performed of said at least one device, said rule processing server being configured to dispatch said action request signal to a respective device of said device group via at least one of said plurality of data communication channels. Furthermore, said communication system further comprising an event detector that is configured to detect a trigger event and to generate the event signal in response to a detection of the trigger event, said event detector being either part of said hearing aid, said communication unit, and/or said at least one external device.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

DETAILED DESCRIPTION

Figure 1:
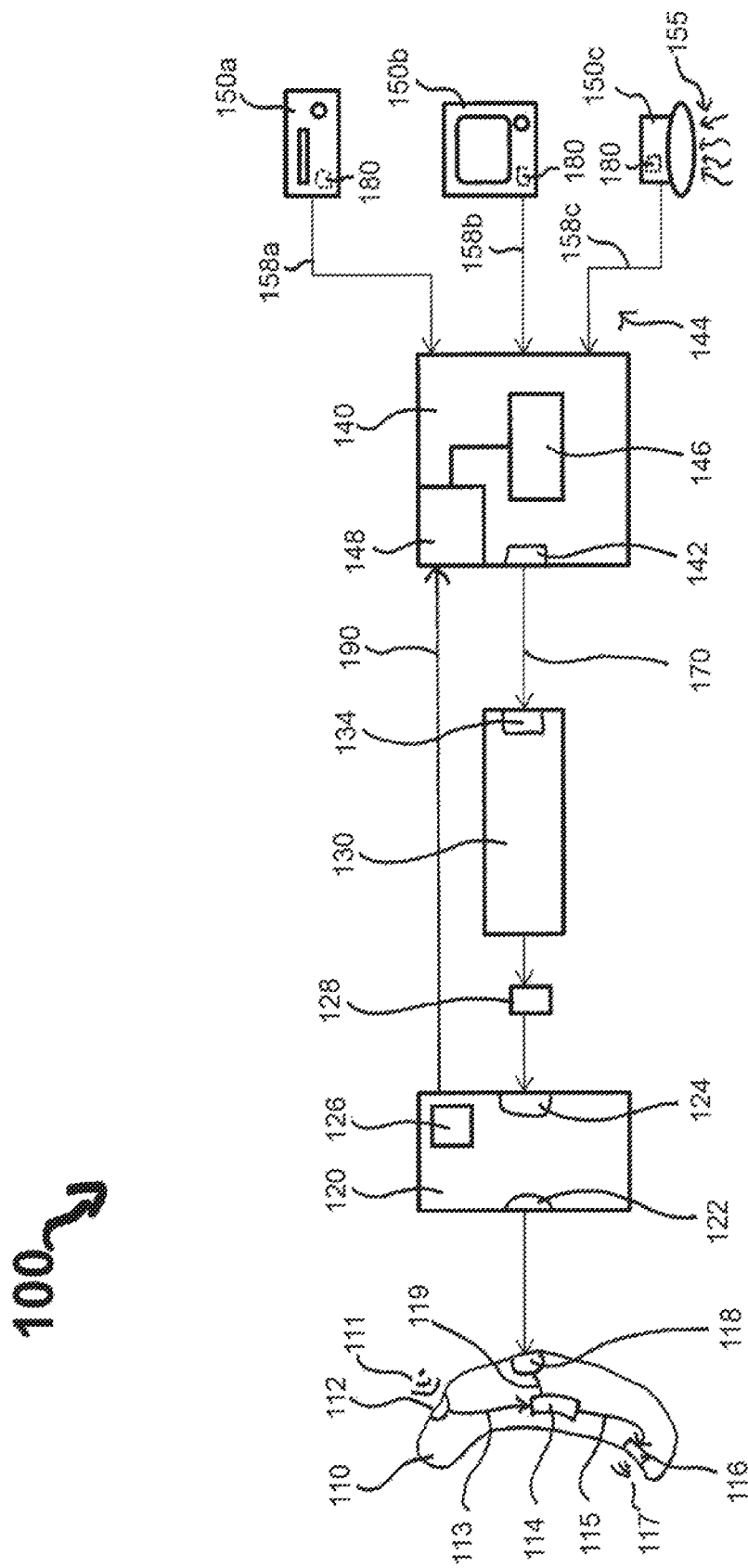
FIG. 1 illustrates a first embodiment of a communication system according to a first aspect of the invention.

The detailed description set forth below in connection with the appended drawings is intended as a description of various configurations. The detailed description includes specific details for the purpose of providing a thorough understanding of various concepts. However, it will be apparent to those skilled in the art that these concepts may be practised without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing aid" may further refer to a device such as an earphone or a headset adapted to receive an audio signal electronically, possibly modifying the audio signal and providing the possibly modified audio signals as an audible signal to at least one of the user's ears. Such audible signals may be provided in the form of an acoustic signal radiated into the user's outer ear, or an acoustic signal transferred as mechanical vibrations to the user's inner ears through bone structure of the user's head and/or through parts of middle ear of the user or electric signals transferred directly or indirectly to cochlear nerve and/or to auditory cortex of the user.

The hearing aid is adapted to be worn in any known way. This may include i) arranging a unit of the hearing aid behind the ear with a tube leading air-borne acoustic signals into the ear canal or with a receiver/loudspeaker arranged close to or in the ear canal such as in a Behind-the-Ear type hearing aid, and/or ii) arranging the hearing device entirely or partly in the pinna and/or in the ear canal of the user such as in a In-the-Ear type hearing aid or In-the-Canal/Completely-in-Canal type hearing aid, or iii) arranging a unit of the hearing aid attached to a fixture implanted into the skull bone such as in Bone Anchored Hearing Aid or Cochlear Implant, or iv) arranging a unit of the hearing device as an entirely or partly implanted unit such as in Bone Anchored Hearing Aid or Cochlear Implant.

Now referring to FIG. 1, which illustrates a first embodiment of a communication system 100 according to a first aspect of the invention.

The communication system 100 comprises a hearing aid 110, a communication unit 120, a relay server 130, a rule processing server 140 and a plurality of external devices 150

The hearing aid 110 is constructed as a BTE type hearing aid and comprises a microphone 112, a sound signal processor 114, an output transducer 116 and a signal interface 118, wherein the microphone 112, the output transducer 116 and the signal interface 118 are operatively connected to the sound signal processor 114. The microphone 112 is further configured to convert an acoustic sound signal 111 into an electric sound signal 113, wherein the sound signal processor 114 is configure to receive and process the electric sound signal 113 and to provide a processed electric sound signal 115 to the output transducer 116, which is configured to convert the processed electric sound signal 115 into a mechanical signal 117, namely into a particular vibration of a membrane providing an acoustic tone. The sound signal processor 114 is further configured to process signals 119 received via said signal interface 118. The sound signal processor 114 is configured to process signals 119 or the electric sound signal 113 with respect to hearing limitations of a user of the hearing aid. The signal interface 118 of this embodiment is a Bluetooth communication interface that is configured to allow data communication with the communication unit 120, which comprises respective signal transmission means 122 to transmit signals to the hearing aid 110.

The communication unit 120 of this embodiment is formed by a smart phone, which provides short range communication with the hearing aid 110 via the signal transmission means 122. The communication unit 120 further comprises a communication unit interface 124 that is configured to receive and/or transmit data from and/or to the relay server 130 at least indirectly via a wireless communication gateway 128. The wireless communication gateway 128 enables data communication between the communication unit 120 and the relay server 130 via the public mobile network.

The relay server 130 comprises a network interface 134 being at least indirectly connected to the rule processing server 140, and is at least indirectly connected to a communication gateway 128 for communicating via the communication unit interface 124 with the communication unit 120.

The rule processing server 140 comprises a data communication interface 142 to communicate with the relay server 130 via an inter-server connection. The rule processing server 140 further communicates with a plurality of external devices 150a, 150b, 150c over a plurality of data communication channels 144. The rule processing server 140 further comprises a rule processor 146, and a rule base 148 comprising a set of rules, each rule defining an action to be triggered in response to a trigger event 155. The rule processor 146 is configured to generate an action request signal 170 in response to an event signal 158a, 158b, 158c representing the trigger event 155. The action request signal 170 is associated to a rule of the set of rules, wherein the action request signal 170 is configured to cause an action of at least one device of a device group comprising the hearing aid 110, the communication unit 120, the relay server 130 and/or at least one of the external devices 150. Furthermore, according to the first aspect of the invention, the action request signal 170 is carrying information that designates at least one of said devices and at least one action to be performed of said at least one device. The rule processing server 140 is further configured to dispatch the action request signal 170 to a respective device of the device group via at least one of the plurality of data communication channels 144.

The communication system 100 further comprises a plurality of event detectors 180 that are configured to detect a trigger event 155 and to generate the event signal 158a, 158b, 158c in response to a detection of the trigger event 155, wherein the event detector 180 is either part of the rule processing server 140, the hearing aid 110, the communication unit 120, the relay server 130 and/or the at least one external device 150. In the illustrated first embodiment, there are event detectors in every external device 150 of the plurality of external devices.

Furthermore, in this embodiment there is a rule generation channel 190 between the communication unit 120 and the rule processing server 140, which is configured to allow the hearing aid user or a further person in charge of the communication unit 120, to generate a rule by defining an action to be triggered in response to a trigger event 155.

The trigger event 155 in the shown embodiment is a beginning or end of a predefined process performed by at least one of the external devices 150. The external devices 150 are a stereo set 150a, a TV set 150b, and a smoke detector 150c. One of the processes that trigger the respective event signal 158a, 158b, 158c is a realization of a data connection between the respective external device 150 and the rule processing server 140 via one of the data communication channels 144. In response to the successful provision of a data connection, the event signal 158a, 158b, 158c is transmitted to the rule processing server 140 and according to a predefined rule of the set of rules, the rule processing server 140 is configured to generate the action request signal 170 which designates the communication unit 120 and a corresponding action of the communication unit 120. The communication unit 120 of this embodiment comprises a sound signal memory 126 which is configured to store data representing at least one predefined sound signal that can be processed by the sound signal processor 114 of the hearing aid 110 and cause the hearing aid 110 to put out an audible acoustic sound signal. The action of the communication unit 120, which is triggered by the successful provision of the data connection is a transmission of a sound signal stored in the sound signal memory, which causes the hearing aid 110 to put out an audible sound signal that informs the hearing aid user that the respective external device 150a, 150b, 150c is connected to the communication system 100.

A further process that triggers the event signal 158a is an activation of a respective music channel of the stereo set 150a. Accordingly, the corresponding action request signal 170 provided by the rule processing server 140 triggers an action of the communication device, wherein the action is a transmission of a sound signal stored in the sound signal memory, which causes the hearing aid 110 to provide an audible sound signal that informs the hearing aid user that a respective music channel of the stereo set 150a is activated. In an embodiment not shown, a visual signal is triggered by the communication system allowing the hearing aid user to see on the communication unit or on a further device a respective visual signal, e.g. a text, a lamp of a certain color or a blinking light, indicating that an external device is connected to the hearing aid, or that a certain music channel is used, or that a power level of the hearing aid is below a predefined power level.

Another process that triggers the event signal 158c is the detection of smoke by the smoke detector 150c. The corresponding action request signal 170 provided to the hearing aid 110 triggers an audible tone and thus allows a warning of the hearing aid user. In this particular embodiment, the smoke detector 150c comprises an RF chip which supports a communication protocol that allows a communication with the rule processing device 140.

A further process that triggers an event signal 158b is the activation of the TV set 150b. The corresponding action request signal 170 provided by the rule processing server 140 causes the communication unit to communicate with the TV set 150b, for instance by means of a Bluetooth data communication interface, in order to allow an automatic indirect connection between TV set 150b and the hearing aid 110 via the communication unit 120.

In an embodiment not shown, the signal interface of the hearing aid is a Bluetooth low energy (BLE) interface or a ZigBee interface.

Figure 2:
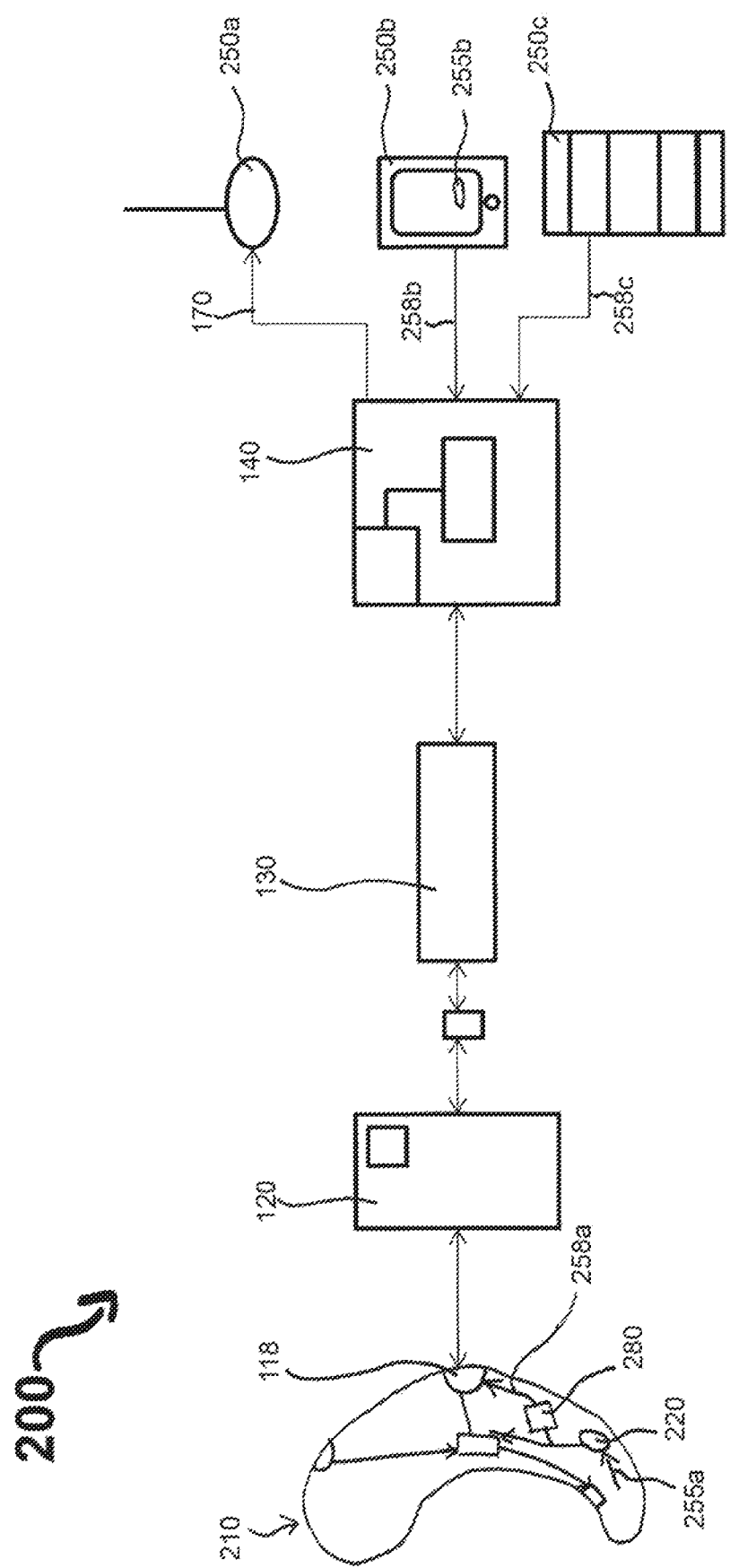
FIG. 2 illustrates a second embodiment of the communication system according to the first aspect of the invention, with an embodiment of a hearing aid according to a second aspect of the invention.
Figure 3:
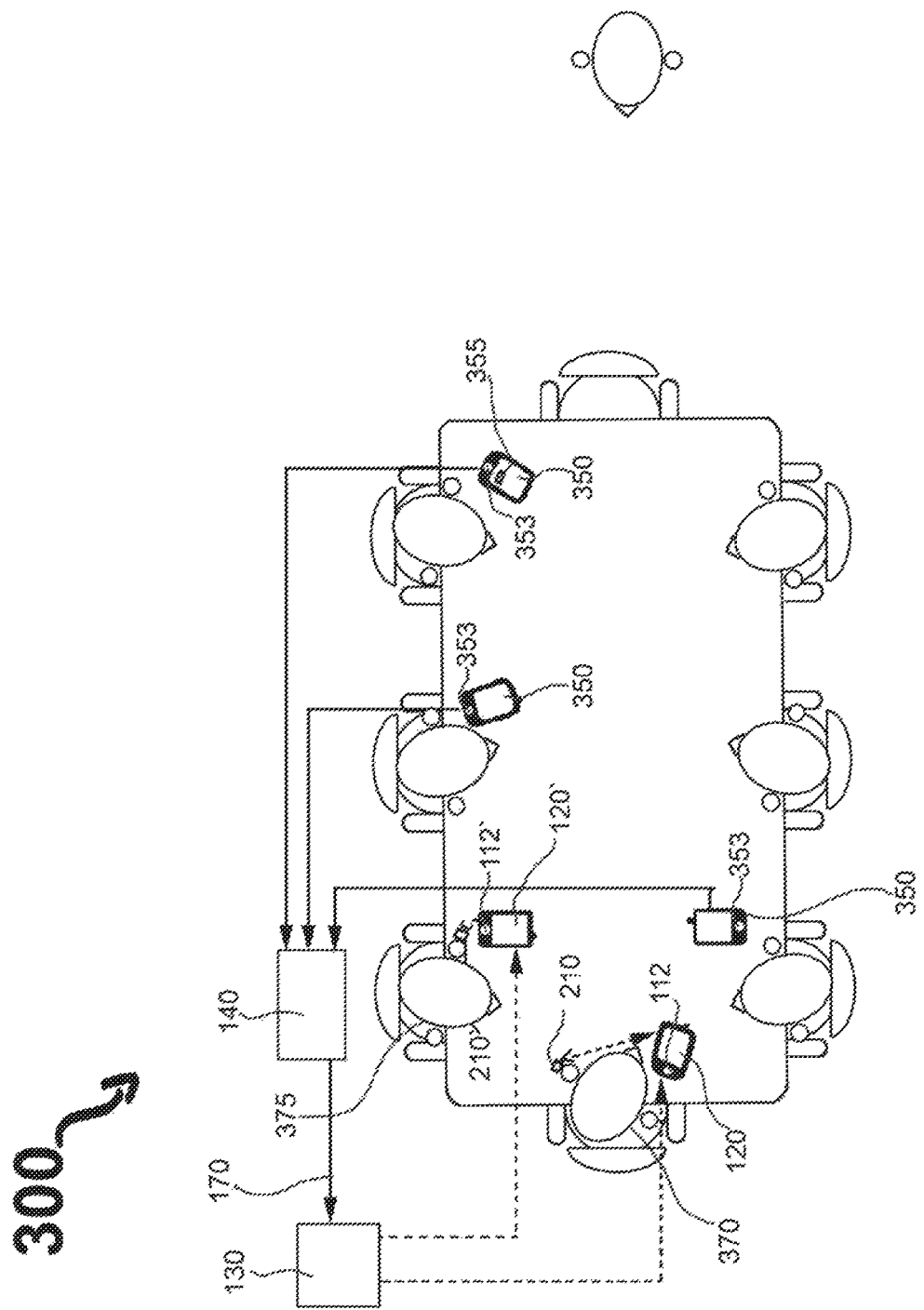
FIG. 3 illustrates a third embodiment of the communication system according to the first aspect of the invention.
Figure 4:
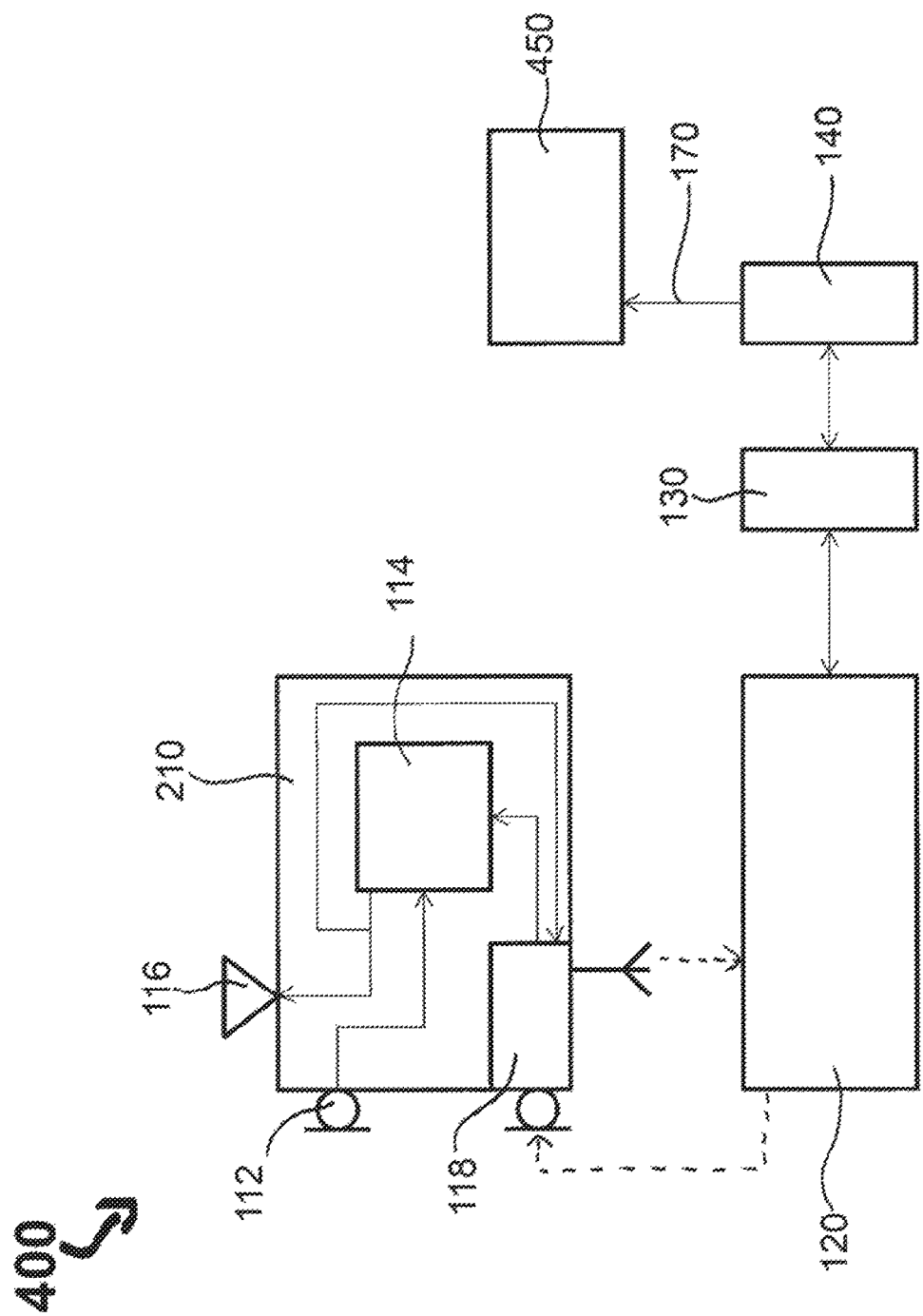
FIG. 4 illustrates a fourth embodiment of the communication system according to the first aspect of the invention.

Further embodiments that illustrate further trigger events and triggered actions as well as further arrangements of the communications system 100 according to the first aspect of the invention are discussed with respect to FIGS. 2 to 4.

FIG. 2 illustrates a second embodiment of the communication system 200 according to the first aspect of the invention with an embodiment of a hearing aid 210 according to a second aspect of the invention.

The communication system 200 is similar to the communication system 100, but differs from the communication system 100 shown in FIG. 1 in view of other external devices 250a, 250b, 250c used within the communication system 100. The communication system 200 comprises a lamp 250a, a smart phone 250b and a web server 250c.

The hearing aid 210 of the communication system 200 forms a further difference to the communication system 100. In contrast to the hearing aid 110, the hearing aid 210 further comprises an event detector 280 that is configured to detect a predefined trigger event 255a and to generate an event signal 258a in response to a detection of such a predefined trigger event 255a. The event detector 280 is further configured to provide the event signal 158 such that the event signal 158 is transmitted via the signal interface 118 of the hearing aid 210. The hearing aid 210 further comprises a user input interface 220 formed by a button and configured to activate or deactivated the hearing aid 210 upon an appropriate pressure on the button.

One of the predefined trigger events 255a detected by the event detector 280 in the hearing aid 210 is the pushing of the button that forms the user input interface 220. An activation of the hearing aid 210 thus triggers the event detector 280 to provide an event signal 258a via the signal interface 118 to the communication unit 120, which is configured to receive the event signal 258a and to transmit it to the rule processing server 140 via the relay server 130. The rule processing server 140 is configured to generate an action request signal 170 according to a respective rule of the rule base, which leads to a transmission of this action request signal 170 to the lamp 250a, which is adapted to give light in response to the generated action request signal 170.

Thereby a hearing aid user can automatically switch on lights in the bedroom by simply activating the hearing aid in the morning.

A further trigger event 255b is an activation of a certain recording modus of the smart phone 250b. This activation triggers the event signal 258b that causes the rule processing server 140 to provide the hearing aid 210 with a sound signal indicative of the current recorded sound data of the smart phone 250b. Therefore, the hearing aid user can perceive the sound signals received by the smart phone 250b. In this embodiment, the communication unit 120 is further configured to allow the user to adapt characteristics of the sound signal such as the sound level. Thus, the communication system 200 may help the hearing aid user to hear sounds, which he cannot properly hear with the own hearing aid 210.

Another trigger event is a detection of stored information of a predefined content by the web server 250c. In particular, the detection of data received by the web server, which represents a text written by a predefined author. The detection of such data triggers the event signal 258c that causes the rule processing server 140 to provide the hearing aid 210 with a sound signal indicative of the information that a text written by the predefined author has been detected by the web server 250c. Thus, the communication system 200 allows the user to perceive information from the internet without reading the respective website. In that way, the user might by informed that a friend wrote something within a social network or a certain author wrote something in an online journal.

Further not shown examples of external devices that might be used in the communication system according to the first aspect of the invention are a doorbell, a radio, a kitchen clock, or an air conditioning system.

FIG. 3 illustrates a third embodiment of the communication system 300 according to the first aspect of the invention.

The communication system 300 is configured as the communication system 200, with the only difference that the external devices 350 are smart phones of other smart phone users, and a further hearing aid 210' of a further user 315 is configured to form a part of the same communication system 300 as the hearing aid 210 of the user 310. The respective smart phones comprise external microphones 353 connected to the smart phone.

The relay server 130 is therefore configured for at least indirectly communicating with a plurality of communication units 120, 120' formed by smart phones of the hearing aid users 310, 315. Each communication unit 120, 120' comprises a signal transmission and/or receiving means to transmit and/or receive signals to and/or from a respective hearing aid 210, 210', as shown in FIG. 2. Each communication unit 120, 120' may comprise an application software which allows the communication unit 120, 120' to establish a communication to the relay server 130. The relay server may be configured to communicate with multiple rule processing servers being configured differently, i.e. a first rule processing server may be an IFTTT server and a second rule processing server may be an Amazon server etc.

A trigger event 355 is an activation of a certain recording modus of at least one of the smart phones 350, 120, 120'. This activation triggers the event signal 358 that causes the rule processing server 140 to generate the action request signal 170. The relay server 130 is further configured to dispatch the action request signal 170 to at least one of said hearing aids 210, 210' indirectly connected to the relay server 170 according to the respective rule of the set of rules. In this embodiment, an activation of a recording modus by one of the external devices 350 leads to the action request signal 170 for both communication units 120, 120', while an activation the recording modus of the communication unit 120 triggers the action request signal 170 for the communication unit 120' and vice versa.

The action request signal 170 causes the respective smart phone 120, 120' to provide the hearing aid 210, 210' with a sound signal indicative of the current recorded sound data of the activated smart phone 350, 120, 120'. Therefore, the hearing aid user can perceive the sound signals received by the respective smart phone 350, 120, 120', or even received by multiple of the respective smart phones 350, 120, 120'. In this embodiment, the communication unit 120, 120' is further configured to allow the user to adapt characteristics of the sound signal such as the sound level for each received sound signal or the signal to noise ratio of the perceived audio signal. Thus, the communication system 300 may help the hearing aid user 310, 315 to hear sounds, which he or she cannot properly hear with the own hearing aid 210, 210', which can be helpful in party situations or during a lecture. A respective user interface provided by the communication unit 120, 120' allows the user 310, 315 to see all activated external devices 350 and communication units 120, 120', i.e. all recording microphones 353 connected to the smart phone. The communication unit 120, 120' is further configured to propose the best available recording microphone based on the respective signal to noise ratio.

In a variant not shown, the further user does not use a wireless hearing aid, but a headset connected the respective communication unit formed by the smart phone.

In an embodiment not shown, the communication unit or the relay server of the communication system further allow the respective user to propose a question by creating a "take over microphone" event, upon a respective user input of the communication unit. The respective action request signal is than provided to a lecturer or to at least one further user of the communication system.

In a further embodiment not shown, the external devices or the communication units are configured such that incoming calls or conversations from other channels pause the recording of the respective microphone.

In another embodiment not shown, all microphones of the communication system are at least indirectly connected to GPS-units, and the action request signal received by a respective communication unit further represents a GPS signal, indicating where in the room the GPS unit connected to the recording microphone is located.

FIG. 4 illustrates a fourth embodiment of the communication system 400 according to the first aspect of the invention.

The communication system 400 comprises at least one hearing aid 210 which receives audio signals provided by the communication unit 120 via the wireless signal interface 118. The audio signals are processed by the sound signal processor 114, such that the processed audio signals are lead to the output transducer 116 that is configured to convert the processed audio signal into a mechanical signal, thereby providing a perceivable acoustic tone to the user.

The communication system 400 differs from the communication system 200 shown in FIG. 2, by the additional feature that the hearing aid 210 is further configured, upon being in a detection mode of the hearing aid 210, to provide information indicative of signal characteristics of all processed signals, i.e. of the processed signals derived from audio signals received via the microphone 112 or via the signal interface 118, to the rule processing server 140 via communication unit 120 and relay server 130. While being in a detection mode, the hearing aid thereby causes the rule processing server 140 to provide an action request signal 170 indicative of signal characteristics of signals processed by the sound signal processor 114.

In the embodiment shown in FIG. 4, the action request signal 170 directly causes an external memory unit 450 to store data representing the processed sound signal provided by the sound processor 116, as well a binary information whether the signal interface 118 received a signal with a signal amplitude above a predefined signal amplitude level or not. In an embodiment not shown, the action request signal causes an external processing unit to provide the respective data to the external memory unit.

The communication system 400 allows teachers or audiologists, to know if the hearing aid user is hearing a provided sound signal in an appropriate way and if the communication device 120 has received the sound signal to be heard by the hearing aid user.

In an embodiment not shown, the action request signal causes the external memory unit to store data representing a signal to noise ratio or other parameters indicative of a sound quality of the processed signal provided to the output transducer of the hearing aid by the sound signal processor. In a further embodiment not shown, the action request signal causes the external memory unit to only store data representing the processed signal provided to the output transducer of the hearing aid by the sound signal processor.

Figure 5:
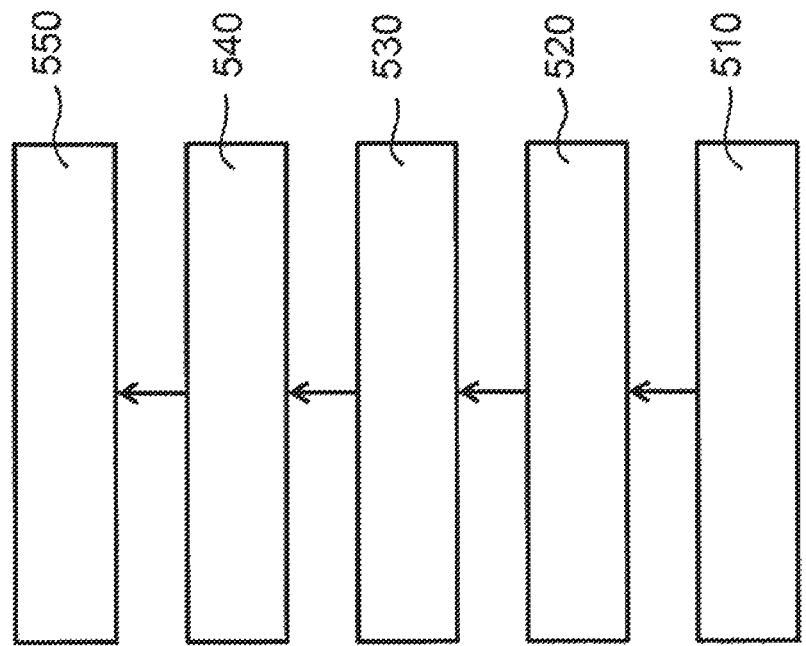
FIG. 5 illustrates an embodiment of a method for operating a communication system according to a third aspect of the invention.

FIG. 5 illustrates an embodiment of a method 500 for operating a communication system according to a third aspect of the invention.

The communication system, which is to be operated by the method 500, comprises a hearing aid, a communication unit, a relay server, a rule processing server, and at least one external device, wherein the hearing aid comprises a microphone, a sound signal processor, an output transducer and a signal interface. The steps of the method 500 are given in the following.

A first step 510 comprises a detecting of a trigger event.

As a further step 520, an event signal is generated upon a detection of said trigger event, wherein the event signal is indicative of a detected trigger event.

Another step 530 comprises the generating of an action request signal in response to an event signal based on a set of rules that define which action request signal is to be generated in response to a particular trigger event signal.

A following step 540 comprises a dispatching of the action request signal to an external device, the relay server, the communication unit or the hearing aid.

As a final step 550 of the method, an action is performed as specified by the action request signal by the external device, the relay server, the communication unit or the hearing aid, respectively.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening elements may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCE NUMBER LIST 100, 200, 300, 400 communication system
110, 210, 210' hearing aid
111 acoustic sound signal
112, 112' microphone
113 electric sound signal
114 sound signal processor
115 processed electric sound signal
116 output transducer
117 mechanical signal
118 signal interface
119 signals received via signal interface
120, 120' communication unit
122 signal transmission/receiving means
124 communication unit interface
126 sound signal memory
128 communication gateway
130 relay server
134 network interface
140 rule processing server
142 data communication interface
144 data communication channels
150a stereo set
150b TV set
150c smoke detector
155 trigger event
158a, 158b, 158c event signal
170 action request signal
180 event detector
190 rule generation channel
250a lamp
250b smart phone
250c web server
255a, 255b trigger event of the second embodiment
258a, 258b, 258c event signal of the second embodiment
280 event detector of the second embodiment
310 hearing aid user
315 further hearing aid user
350 external devices
353 external microphone
355 trigger event of the third embodiment
358 event signal of the third embodiment
450 external memory unit
500 method
510 first step of the method
520 further step of the method
530 another step of the method
540 following step of the method
550 final step of the method

The invention claimed is:

1. A rule processing server that identifies actions to be triggered in response to one or more trigger events, the rule processing server comprising:
a data communication interface to communicate with a relay server and a plurality of external devices over a plurality of data communication channels,
a rule base including a set of rules, each rule defining an action to be triggered in response to a trigger event,
an event detector configured to detect a beginning, or an end, of a predefined process performed by the rule processing server or a combination thereof as a trigger event and to generate an event signal, and
rule processing server configured to
generate an action request signal in response to the event signal representing the trigger event being associated to a rule of said set of rules, said action request signal being configured to cause an action of at least one device of a device group comprising a hearing aid, a communication unit, the relay server, and/or one of the plurality of external devices, and
transmit said action request signal to a respective device of the device group via at least one of said plurality of data communication channels, wherein
said action request signal carries information that designates at least one of said devices and at least one action to be performed of said at least one device.

2. The rule processing server according to claim 1, wherein the transmitted action request signal is configured to cause the communication unit or the relay server to transmit a predefined sound signal to a hearing aid and/or cause the hearing aid to transmit a predefined sound signal to a sound signal processor of the hearing aid.

3. The rule processing server according to claim 1, wherein the relay server is at least indirectly connected to a plurality of communication gateways for communicating with a corresponding plurality of communication units, wherein each communication unit comprises a signal transmission and/or receiving means to transmit and/or receive signals to and/or from a respective hearing aid.

4. The rule processing server according to claim 3, wherein the relay server is further configured to dispatch the generated action request signal to at least one of a plurality of hearing aids connected to said relay server according to the respective rule of said set of rules.

5. The rule processing server according to claim 1, wherein the generated action request signal comprises a representation of a sound signal.

6. The rule processing server according to claim 1, wherein the generated action request signal carries information that designates an activation or a deactivation of one of the plurality of external devices or of a hearing aid, or a predefined change of a sound level provided by a hearing aid.

7. A method for operating a communication system that comprises a hearing aid, a communication unit, a relay server, a rule processing server, and at least one external device, wherein the hearing aid comprises a microphone, a sound signal processor, an output transducer and a signal interface, the method comprises the steps of:
  detecting, at the rule server, a beginning, or an end, of a predefined process performed by the rule processing server or a combination thereof as a trigger event based on signals received from one or more of the hearing aid, the communication unit, the relay server, and the at least one external device;
  generating an event signal, the event signal having been generated upon detection of the trigger event and being indicative of the detected trigger event,
  generating an action request signal in response to the event signal based on a set of rules that define which action request signal is to be generated in response to a particular trigger event signal,
  transmitting the generated action request signal to an external device, the relay server, the communication unit or the hearing aid, wherein
  the transmitted action request signal identifies at least one action to be performed by the external device, the relay server, the communication unit or the hearing aid, respectively.

8. The method of claim 7, wherein the generated action request signal is transmitted to the hearing aid and the hearing aid is configured to output an audio signal upon reception of the transmitted action request signal.

9. The method of claim 7, wherein the generated action request signal is transmitted to the relay server or the communication unit and the relay server or the communication unit, respectively, transmits a predefined sound signal as specified by the generated action request signal to a hearing aid upon reception of the action request signal.

10. The method of claim 1, wherein the transmitted action request signal is configured to cause the communication unit or the relay server to transmit a predefined sound signal to a hearing aid and/or cause the hearing aid to transmit a predefined sound signal to a sound signal processor of the hearing aid.

11. The method of claim 1, wherein the relay server is at least indirectly connected to a plurality of communication gateways for communicating with a corresponding plurality of communication units, wherein each communication unit comprises a signal transmission and/or receiving means to transmit and/or receive signals to and/or from a respective hearing aid.

12. The method of claim 11, wherein the relay server is further configured to dispatch the generated action request signal to at least one of a plurality of hearing aids connected to said relay server according to the respective rule of said set of rules.

13. The method of claim 7, wherein the generated action request signal comprises a representation of a sound signal.

14. The method of claim 7, wherein the generated action request signal carries information that designates an activation or a deactivation of one of the plurality of external devices or of a hearing aid, or a predefined change of a sound level provided by a hearing aid.

* * * * *